Figure 1:
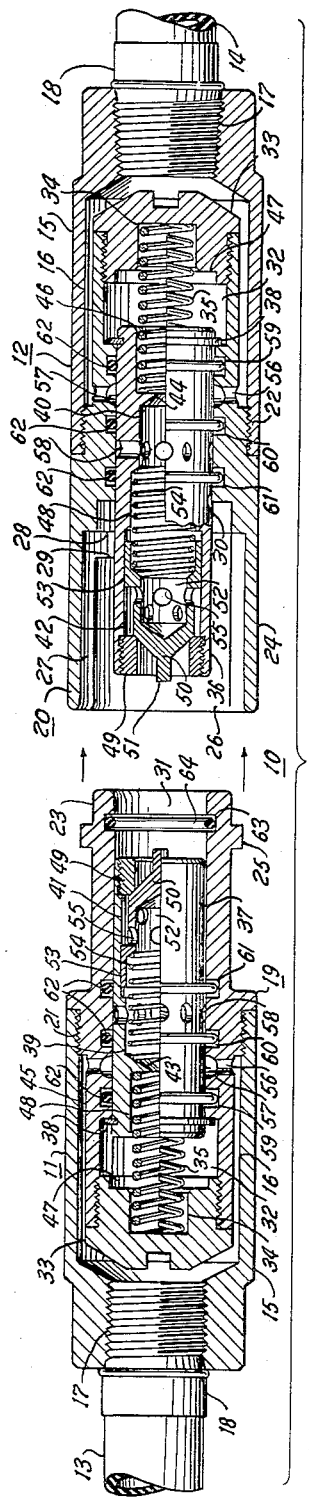

Sept. 30, 1958

C. D. HICKEY ET AL 2,854,258

SELF-SEALING COUPLING

Filed Jan. 26, 1955

3 Sheets-Sheet 1

INVENTORS
Clyde D. Hickey
James F. Slough, Jr.

BY Ashley & Ashley

ATTORNEYS

Sept. 30, 1958  C. D. HICKEY ET AL  2,854,258
SELF-SEALING COUPLING

Filed Jan. 26, 1955  3 Sheets-Sheet 2

INVENTORS
Clyde D. Hickey
James F. Slough, Jr.

BY  Ashley & Ashley

ATTORNEYS

Sept. 30, 1958  C. D. HICKEY ET AL  2,854,258
SELF-SEALING COUPLING
Filed Jan. 26, 1955  3 Sheets-Sheet 3
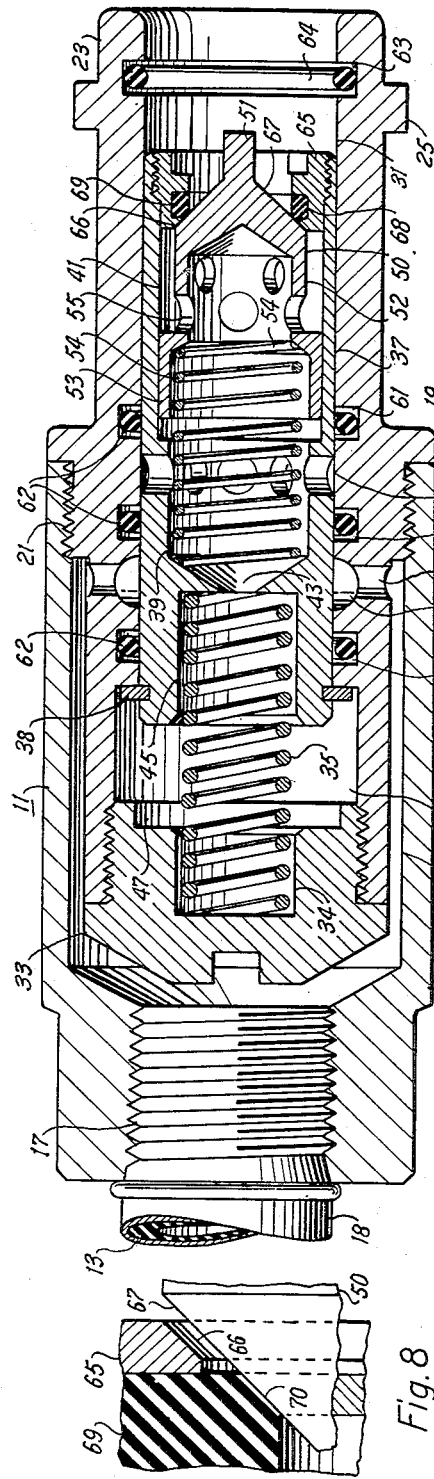
Fig. 6
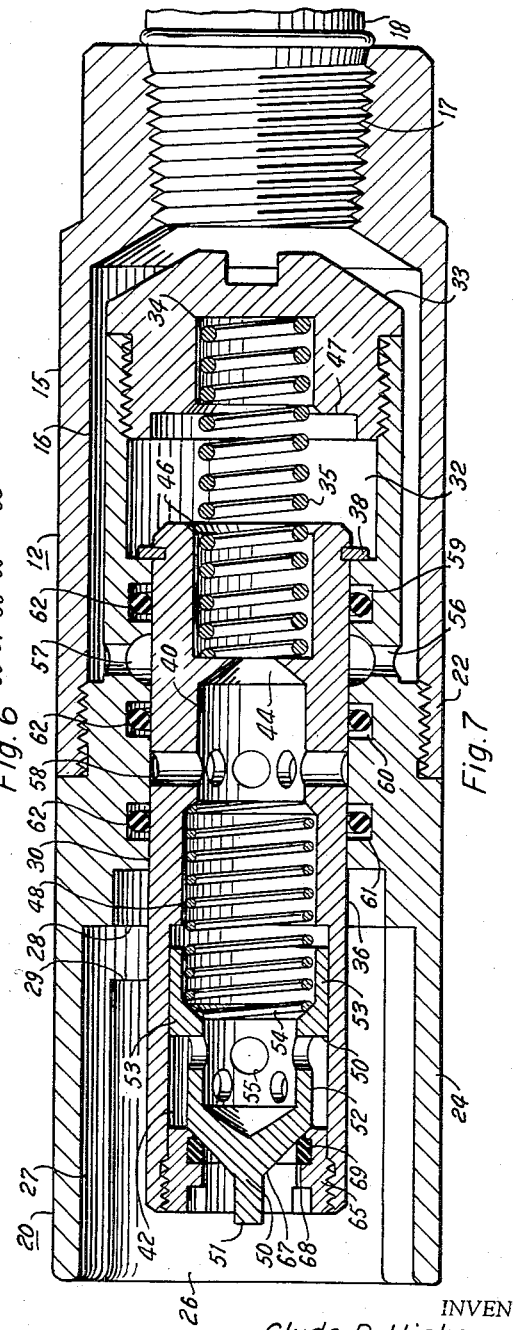
Fig. 7
Fig. 8
INVENTORS
Clyde D. Hickey
James F. Slough, Jr.
BY Ashley & Ashley
ATTORNEYS

United States Patent Office 2,854,258
Patented Sept. 30, 1958

2,854,258
SELF-SEALING COUPLING

Clyde D. Hickey and James F. Slough, Jr., Fort Worth, Tex., assignors of one-half to Harbisson-Fischer Manufacturing Company, Inc., Fort Worth, Tex., a corporation of Texas Application January 26, 1955, Serial No. 484,188

11 Claims. (Cl. 284—4)

This invention relates to new and useful improvements in self-sealing couplings for fluid conductors.

One object of the invention is to provide an improved coupling for connecting fluid conductors under high pressure or vacuum and at low temperatures without loss of fluid and with minimum effort.

An important object of the invention is to provide an improved coupling for a fluid conductor having a pair of coacting members adapted to be connected and arranged to be sealed against the egress of fluid during connection and disconnection whereby no great force is required to couple and uncouple the members.

A particular object of the invention is to provide an improved self-sealing coupling for a fluid conductor having valve means for sealing against the escape of fluid during coupling and uncoupling and shielded from the pressure of the fluid in the conductor when closed whereby the valve means may be opened without the necessity of overcoming the full pressure of said fluid.

Another object of the invention is to provide an improved self-sealing coupling, of the character described, wherein the valve means includes a primary valve and a secondary valve coacting therewith to provide a dual seal, the secondary valve being the first to open and the last to close so as to serve as a safety valve for the primary valve.

A further object of the invention is to provide an improved self-sealing coupling, of the character described, wherein the coupling members have coacting complementary valve means constructed of interchangeable parts so as to reduce the cost of manufacture, replacement and repair.

Another object of the invention is to provide an improved self-sealing coupling, of the character described, which is of such construction that its coacting members may be rather loosely coupled so as to permit relative movement therebetween for cracking ice formed on the exterior thereof, due to the low temperature of the fluid, and thereby facilitate uncoupling of the members.

A construction designed to carry out the invention will be hereinafter described, together with other features of the invention.

Figure 2:
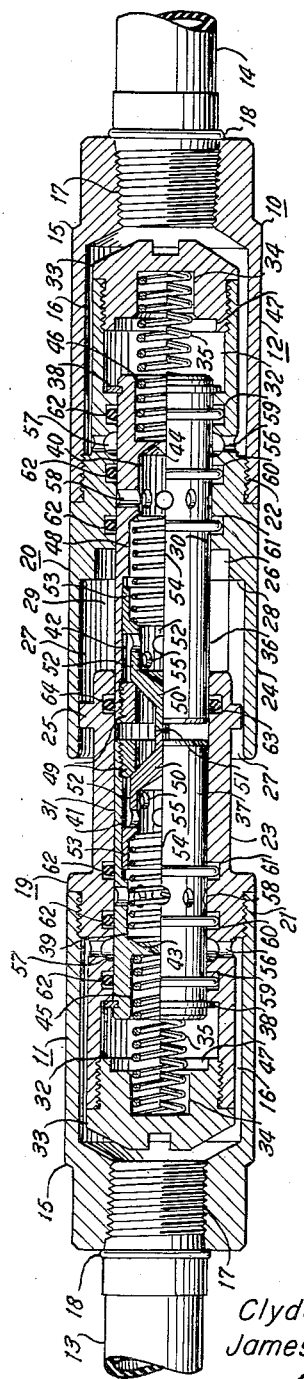
Figure 3:
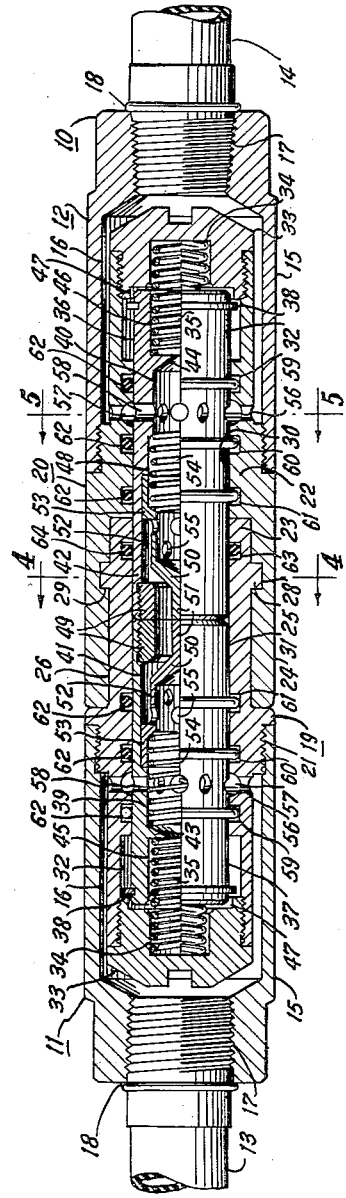
Figure 5:
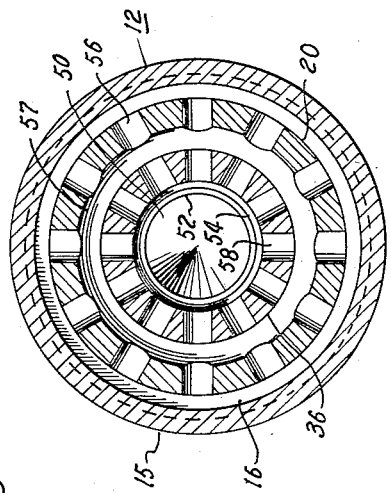
Figure 4:
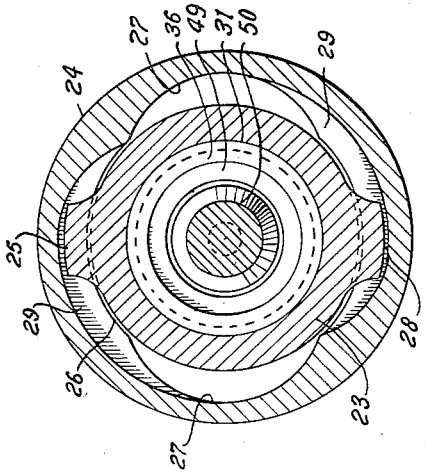

The invention will be more readily understood from a reading of the following specification and by reference to the accompanying drawings, wherein examples of the invention are shown, and wherein:

Fig. 1 is a longitudinal, sectional view of a self-sealing coupling, constructed in accordance with the invention, with its coacting members separated, Fig. 2 is a view, similar to Fig. 1, showing the coupling members partially engaged, Fig. 3 is a view, similar to Figs. 1 and 2 and taken at a right angle thereto, showing the coupling members fully connected, Fig. 4 is an enlarged, cross-sectional view, taken on the line 4—4 of Fig. 3, Fig. 5 is an enlarged, cross-sectional view, taken on the line 5—5 of Fig. 3, Fig. 6 is an enlarged, longitudinal, sectional view of one of the coupling members having a modified seat for its poppet valve, Fig. 7 is a view, similar to Fig. 6, of the other coupling member and its modified poppet valve seat, and Fig. 8 is an enlarged, detailed view showing the projection of the rubber seat.

In the drawings the numeral 10 designates a self-sealing coupling embodying the principles of the invention and including a pair of coacting, complementary members or male and female connectors 11 and 12 for hose or other fluid conductors 13 and 14. Each connector includes a tubular housing 15 having an enlarged, cylindrical chamber or fluid passage 16, one end of which is reduced in diameter and screw-threaded to provide a box or socket 17 for communicating engagement by a fitting or pin 18 carried by the hose 13 and 14. Tubular valve bodies 19 and 20 extend axially into the chambers 16 in spaced relation thereto and have screw-threaded connection with the outer ends of said chambers as shown at 21 and 22. The valve bodies are identical except for their end portions which project from the outer ends of the housings 15 and which are adapted to be engaged for connecting the coupling members 11 and 12. A coaxial, male fitting or cylindrical tube 23 is carried by the body 19 for engagement in a complementary female fitting or cylindrical sleeve 24 at the outer end of the body 20. It is noted that the valve bodies form parts of their respective coupling members or connections.

Although any readily detachable connection may be employed, preferably, the fittings are coupled by a bayonet-type joint which includes a pair of diametrically-opposed external lugs or radial projections 25 adjacent the outer end of the tube 23 (Fig. 4). The sleeve 24 has a bore 26 of slightly greater diameter than the tube with complementary grooves 27 extending longitudinally thereof for receiving the lugs 25. The inner ends of the longitudinal grooves 27, which are of less length than the bore 26 so as to terminate short of the inner end thereof, are intersected by arcuate, transverse grooves 28 extending clockwise therefrom (Fig. 4) and circumferentially of said bore to provide transverse shoulders 29 beneath which the lugs may be engaged upon insertion and turning of the tube 23 (Fig. 3). It is noted that the width of the longitudinal grooves and the length of the transverse grooves are considerably greater than the width of the lugs 25 to facilitate engagement of said lugs with said grooves. Also, the width of the transverse grooves 28 is sufficiently greater than the thickness of the lugs to permit limited relative movement between the fittings or connections. Preferably, the shoulders 29 are recessed to permit slight outward movement of the lugs 25 for preventing accidental or unintentional disconnection.

A coaxial, reduced bore 30 extends inwardly of the valve body 20 from and in communication with the bore 26 of the sleeve 24, while the valve body 19 and its tube 23 has an axial bore 31 of the same diameter and of greater length than the bore 30. The inner end of each of the bores 30 and 31 is enlarged to provide a counterbore or chamber 32 which is closed by an end cap 33 screw-threaded thereinto and having an axial recess or socket 34 for receiving one end of a helical spring 35. A tubular valve element 36, in the form of a sleeve valve or plunger, is reciprocally or slidably mounted in the bore 30, while the bore 31 slidably receives a similar tubular valve element 37 of slightly less length. These bores function as cylinders for their respective valve elements and the latter are confined against outward displacement by retaining rings 38 carried by the inner ends of said elements for engaging the shoulders between said bores and their counterbores 32. It is noted that the bores and counterbores of the valve bodies coact to provide fluid passages for said bodies.

An axial bore 39 is formed in the medial portion of the valve element 37 and communicates with a coaxial counterbore or cylinder 41 in its outer end and is separated by a radial flange 43 from a coaxial recess or socket 45 in its inner end which receives one end of the spring 35, whereby the valve element is urged outwardly by said spring bearing against the flange. The valve element 36 is similar and has a similar medial bore 40, outer counterbore 42, separating flange 44 and inner socket 46, with a counterbore 48 being interposed between the bore 40 and counterbore 42. An annular recess 47 concentrically surrounds the socket 34 of each cap 33 to accommodate the inner end of the valve element upon its inward movement (Fig. 3).

An annular valve seat 49 is screw-threaded or otherwise secured in the outer end of each of the counterbores 41 and 42 of the valve elements 37 and 36 for engagement by a poppet valve 50 having an axial, outwardly-directed pin or stem 51 projecting beyond its respective counterbore when the poppet valve is seated. Each poppet valve 50 includes a cylindrical, cup-shaped body 52 having an enlarged, counterbored, inner end or piston portion 53 slidably engaging the cylinder formed by each of the counterbores 41 and 42. A helical spring 54 is confined in each of the counterbores 39 and 48 and is engaged in the counterbored, piston portion 53 of each poppet valve for urging the valve into engagement with its seat 49. Although the spring 54 bears against the flange 43 of the valve element 37, the comparable spring of the valve element 36 bears against the shoulder formed between the bore 40 and counterbore 48. It is noted that the shoulders formed between the bore 39 and counterbore 41 and between the counterbores 42 and 48 limit inward movement of the poppet valves. Outwardly of its piston portion 53, the body 52 of each valve is spaced from each of the counterbores 41 and 42 and a plurality of radial openings or ports 55 are formed in said body to provide constant communication between its interior and respective counterbore inwardly of its valve seat.

A plurality of openings or ports 56 are formed in the inner portion of each of the valve bodies 19 and 20, inwardly of and adjacent their respective screw-threaded connections 21 and 22 with the housings 15, and radiate from an annular, radial groove or recess 57 provided in each of the bores 31 and 30 to establish communication between said bores and the chambers 16 of said housings. The valve elements 37 and 36 have a plurality of radial openings or ports 58 communicating with their medial bores 39 and 40 and adapted to register with the grooves 57 when said elements are reciprocated inwardly for establishing communication of said bores with the housing chambers (Figs. 3 and 5). When the valve elements are held outwardly by their springs 35, the inner portions of said elements close the grooves and the bores 31 and 30 of the valve bodies close the ports 58 to shut off communication of said bores with said housing chambers (Figs. 1 and 2).

Annular radial grooves or recesses 59, 60 and 61 are formed in each of the bores 31 and 30 for receiving suitable packing 62 to seal off between said bores and the valve elements. Preferably, the packing is in the form of O-rings or other rings which seal under pressure and which are movable and flexible in their grooves so as to provide sufficient clearance between the valve body bores and valve elements for facilitating reciprocal movement of said valve elements. As shown, the width of the grooves is considerably greater than the cross-sectional diameter of the O-rings. The grooves 59 and 60 are disposed on opposite sides of the ports 56, while the ports 58 are positioned between the grooves 60 and 61 when the valve elements are in their outermost or closed positions.

For sealing off between the valve element 36 and the bore 31 of the tube 23 upon initial engagement or final disengagement of the coupling members as shown in Fig. 2, as well as when said members are coupled as shown in Fig. 3, an annular, radial groove 63 is formed in the outer end portion of said bore for receiving an O-ring or packing 64 similar to the O-rings 62. The initial engagement or final disengagement of the coupling members 11 and 12 is shown in Fig. 2 and it is noted that the O-ring 64 engages the valve element 36 and seals off between said valve element and the bore 31 of the tube 23 prior to engagement of the axial stems 51 and unseating of the poppet valves 50. The tube is inserted in the bore 26 of the sleeve 24 with the lugs 25 engaged in the longitudinal grooves 27 of said bore. When the lugs reach the lower end of the longitudinal grooves, the coupling members are turned relative to each other to move said lugs clockwise of said grooves into the arcuate, transverse grooves 28 so as to position said lugs beneath the shoulders 29 of the sleeve to connect the coupling members as shown in Figs. 3 and 4. During this engagement, the poppet valves are unseated by being moved inwardly of the bores 41 and 42 of the valve elements 37 and 36 away from the valve seats 49. Immediately before the enlarged piston portions 53 of the poppet valves 50 strike the shoulders between the bores 39 and 41 and between the bores 42 and 48, the ends of the valve elements or their valve seats engage and said elements move inwardly to the position shown in Fig. 3.

This movement disposes the ports 58 of the valve elements in registration with the annular grooves 57 of the valve bodies 19 and 20 so as to establish communication between the medial bores 39 and 40 of said valve elements with the chambers 16 of the valve housings 15, whereby fluid may flow from one of said chambers through the registered ports 56 and 58 and groove 57 into the medial bore and counterbore 41 or 48 of one of said valve elements and through the ports 55 of one of the poppet valves into the outer counterbore 41 or 42 of one of said elements. From the outer counterbore, the fluid flows through the valve seats 49 into the outer counterbore of the other valve element, through the poppet valve ports 55 into the medial bore of said other element and through the registered ports 56 and 58 and groove 57 into the chamber 16 of the other valve housing. Manifestly, the unrestricted flow of fluid from one hose or conductor 13 to the other conductor 14 is permitted when the elements are in this position. It is noted that the O-rings 62 and the grooves 59 and 60 coact to seal off around the registered ports and grooves and that the O-ring in the groove 61 as well as the O-ring 64 of the groove 63 continue to seal off around the valve bodies; however, it is noted that only the latter is necessary when the members are coupled.

Due to the communication of the bores 39 and 40 with the sockets 45 and 46, the fluid enters the chambers 32 of the valve bodies so as to equalize the fluid pressure exerted on the valve elements. Before registration of the ports and grooves, however, the fluid pressure within the valve body chambers and the bores and counterbores of the valve elements is less than the pressure of the fluid in the conductors and the housing chambers 16 because said elements are urged outwardly by their springs 35 upon uncoupling of the members 11 and 12 and the areas of said valve body chambers are increased to permit expansion of the fluid trapped by the ports and grooves moving out of registration. An additional small area of expansion is provided by the opening of the poppet valves 50 upon initial engagement of the coupling members. As a result, the closed valve elements are not exposed to and are shielded by the end caps 33 of the valve bodies from the full pressure of the fluid in the conductors and housing chambers whereby it is only necessary to overcome the reduced pressure of the trapped fluid and no great force is required to open said valve elements.

The latter is important in handling low temperature fluids, such as refrigerants or other relatively cold and confined gases, which undergo appreciable expansion and increased pressure upon warming to more normal temperatures. For example, one specific use of the coupling is in applying refrigerated gas to the coils of refrigerated motor trucks or other vehicles or compartments. Upon warming of the gas confined in the coils, it is necessary to replenish the same in order to maintain the desired degree of refrigeration. In many instances, particularly in hot weather, the pressure of the warm gas is so great that it is extremely difficult and excessive force is required to connect coupling members having conventional valves exposed to the full pressure of said warm gas. Due to the shielding of the valve elements by the end caps of the valve bodies and the utilization of a sleeve valve arrangement, it is only necessary to overcome the lower pressure of the gas or fluid trapped by the closed valve elements in order to open said elements and connect the coupling members of the present invention. Of course, it is necessary to overcome the force of the springs but the resistance of said springs is only sufficient to close and hold the valve elements closed. It is noted that the coupling is adapted for use in handling nearly any fluid and has been successfully tested with fluids having temperatures of —40° F. under high pressures and vacuums.

Although the use of the poppet valves is preferred, it is noted that the valve elements will function without said valves and are useable in some installations. The poppet valves are secondary and provide dual seals in coaction with the sleeve valves as well as serving as safety valves for the latter. Of primary importance is the function of the poppet valves in closing the outer counterbores of the valve elements to prevent the escape of fluid upon coupling and uncoupling. Many gases and other fluids are dangerous, particularly when under high pressures and/or low temperatures, and it is essential that a minimum quantity of gas be released upon connection and disconnection of the coupling members. Manifestly, the poppet valves 50 permit the egress of only a minute quantity of fluid because, upon uncoupling the members 11 and 12, said valves engage their seats 49 before the tube 23 is withdrawn from engagement with the valve element 36 and the only fluid which can escape is between said seats. Since the springs 35 move the valve elements outwardly so as to position their ports 58 out of registration with the grooves 57 and between the O-rings 62 of the grooves 60 and 61 simultaneously with the withdrawal of the tube, said valve elements are closed prior to the seating of the poppet valves. It is noted that the plurality of O-rings 62 provide another function in the event of the failure of one or more of said O-rings to an extent sufficient to permit the pressure of the fluid in one of the conductors and the communicating housing chamber 16 to enter the valve body mounted therein and equalize the pressure in said body. This increased pressure would make coupling more difficult so as to give positive indication of the failure. It is noted that either one of the coupling members is useable independently of the other member and might be used with an entirely dissimilar connection. All sealing elements and surfaces or working parts of the valves are protected from external damage by virtue of being wholly enclosed within the coupling members.

In Figs. 6 and 7, the coupling members 11 and 12 with their housings 15, valve bodies 19 and 20, tube 23, sleeve 24, valve elements 36 and 37, poppet valves 50 and other parts are shown on an enlarged scale to illustrate a modified valve seat 65. The latter is screw-threaded in the outer ends of each of the counterbores 40 and 41 of the valve elements for engagement by one of the poppet valves. Each valve seat 65 includes an annular body or ring having an internal bevelled seating surface 66 at its inner end and each poppet valve has an elongated, complementary seating surface 67 forming the end of its cup-shaped body and carrying its axial stem 51. Outwardly of its bevelled surface, an internal groove or recess 68 is formed in the valve seat body to receive an annular seat or ring 69 of rubber or other suitable material. Preferably, the annular seat 69 is bonded in the recess 68 and, as shown most clearly in Fig. 8, has a bevelled seating surface 70 projecting radially inward of the bevelled seating surface 66 of the valve seat body. The projection and flexibility of the seating surface 70 provides a positive seal with the surface 67 of the poppet valve to assure seating thereof in the event that minute foreign matter is trapped therebetween.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. A coupling including a member adapted to be connected to a fluid conductor and having a communicating bore and fluid passage, a valve element reciprocable in the bore and having a bore, the member and element having openings for establishing communication between the bore of the element and said passage upon inward reciprocation of the element, a valve seat in the bore of said element, a valve reciprocable in said element bore for engaging the valve seat, and means for imparting inward reciprocation to said element to establish communication between said passage and element bore.

2. A coupling as set forth in claim 1 including means in the fluid passage of the member shielding the valve element from the pressure of the fluid in the conductor and said passage when said element is reciprocated outwardly.

3. A coupling as set forth in claim 1, including a connector carried by the member for coupling with a complementary connector.

4. A coupling including a member adapted to be connected to a fluid conductor and having a communicating bore and fluid passage, a connector carried by the member for coupling with a complementary connector, a spring-pressed sleeve valve reciprocable in the bore and urged outwardly thereof, means limiting outward reciprocation of the sleeve valve, said member and sleeve valve having openings adapted to register upon inward reciprocation of said valve for establishing communication between said passage and the bore of said sleeve valve, a valve seat in the bore of said sleeve valve, and a spring-pressed secondary valve reciprocable in said valve bore and urged into engagement with the valve seat for closing the outer end of said valve bore, the secondary valve projecting outwardly of said sleeve valve so as to be unseated upon initial coupling of the connector and prior to inward reciprocation of said sleeve valve so as to be seated after outward reciprocation of said sleeve valve upon uncoupling of said connector.

5. A coupling member for a fluid conductor including a tubular housing adapted to be connected to the conductor and having a chamber communicating therewith, a valve body connected to the housing and extending in spaced relation within the chamber, a connector carried by the valve body for coupling with a complementary connector, said valve body having an outwardly-opening fluid passage communicating with said chamber, a sleeve valve reciprocable in said passage, means for urging the sleeve valve outwardly of said passage, means limiting outward reciprocation of the sleeve valve, said body and sleeve valve having ports adapted to register upon inward reciprocation of said valve for establishing communication between said chamber and the bore of said sleeve valve, a valve seat in the bore of said sleeve valve, a secondary valve reciprocable in said bore, and means for urging the secondary valve into engagement with the valve seat for closing the outer end of said bore, the secondary valve projecting outwardly of said sleeve valve so as to be unseated upon initial coupling of the connector and prior to inward reciprocation of said sleeve valve and registration of the ports.

6. A self-sealing coupling for fluid conductors including a pair of coupling members, means detachably connecting the coupling members, a valve element reciprocable in each member, each valve element and coupling member having coacting flow control means, means for reciprocating the valve elements to open said coacting flow control means upon connection of said members to permit flow through the latter, and means carried by one member outwardly of its valve element for sealing engagement with the valve element of the other member upon initial connection of said members and prior to reciprocation of said valve elements and opening of said coacting flow control means.

7. A self-sealing coupling for fluid conductors including a pair of coupling members having fluid passages and adapted to be detachably connected, a valve element reciprocable in the passage of each member for controlling flow therethrough, the valve elements being engaged and reciprocated inwardly to open said passages upon connection of said members, and means carried by one member outwardly of its valve element for sealing engagement with the valve element of the other member upon initial connection of said members and prior to inward reciprocation of said elements and opening of said passages.

8. A self-sealing coupling for fluid conductors including a pair of coupling members having fluid passages and adapted to be detachably connected, a valve element reciprocable in the passage of each member for controlling flow therethrough and having a bore, each member and valve element having openings for establishing communication between the bore of the element and said passage upon inward reciprocation of said element, the valve elements being engaged and reciprocated inwardly to establish communication between the passage and bore of each element upon connection of said members, a valve seat in each element bore, a valve reciprocable in each element bore for engaging the valve seat, and means carried by one member outwardly of its valve element for sealing engagement with the valve element of the other member upon initial connection of said members and prior to inward reciprocation of said elements and opening of said passages.

9. A self-sealing coupling as set forth in claim 8 wherein each valve includes axially projecting means for engagement with each other to unseat the valves upon connection of the coupling members and prior to engagement and inward reciprocation of the valve elements, the projecting means remaining engaged and holding said valves unseated until after disengagement and outward reciprocation of said valve elements upon disconnection of said coupling members.

10. A self-sealing coupling for fluid conductors including a pair of coupling members having fluid passages and adapted to be detachably connected, a valve element reciprocable in the passage of each member for controlling flow therethrough and having a bore, each member and valve element having openings for establishing communication between the bore of the element and said passage upon inward reciprocation of said element, the valve elements being engaged and reciprocated inwardly to establish communication between the passage and bore of each element upon connection of said members, a valve seat in each element bore, and a valve reciprocable in each element bore for engaging the valve seat.

11. A self-sealing coupling as set forth in claim 10 wherein each valve includes axially projecting means for engagement with each other to unseat the valves upon connection of the coupling members and prior to engagement and inward reciprocation of the valve elements, the projecting means remaining engaged and holding said valves unseated until after disengagement and outward reciprocation of said valve elements upon disconnection of said coupling members.

References Cited in the file of this patent

UNITED STATES PATENTS

| 2,453,741 | Bopp | Nov. 16, 1948 |
| 2,471,237 | Pasturczak | May 24, 1949 |
| 2,614,830 | Mitchell | Oct. 21, 1952 |